Dec. 9, 1958     W. H. DOYLE ET AL     2,863,618
AIRPLANE COUPLING MEANS

Filed April 29, 1954     3 Sheets-Sheet 1

INVENTOR.
William J. O'Donnell
BY and William H. Doyle
ATTORNEY.

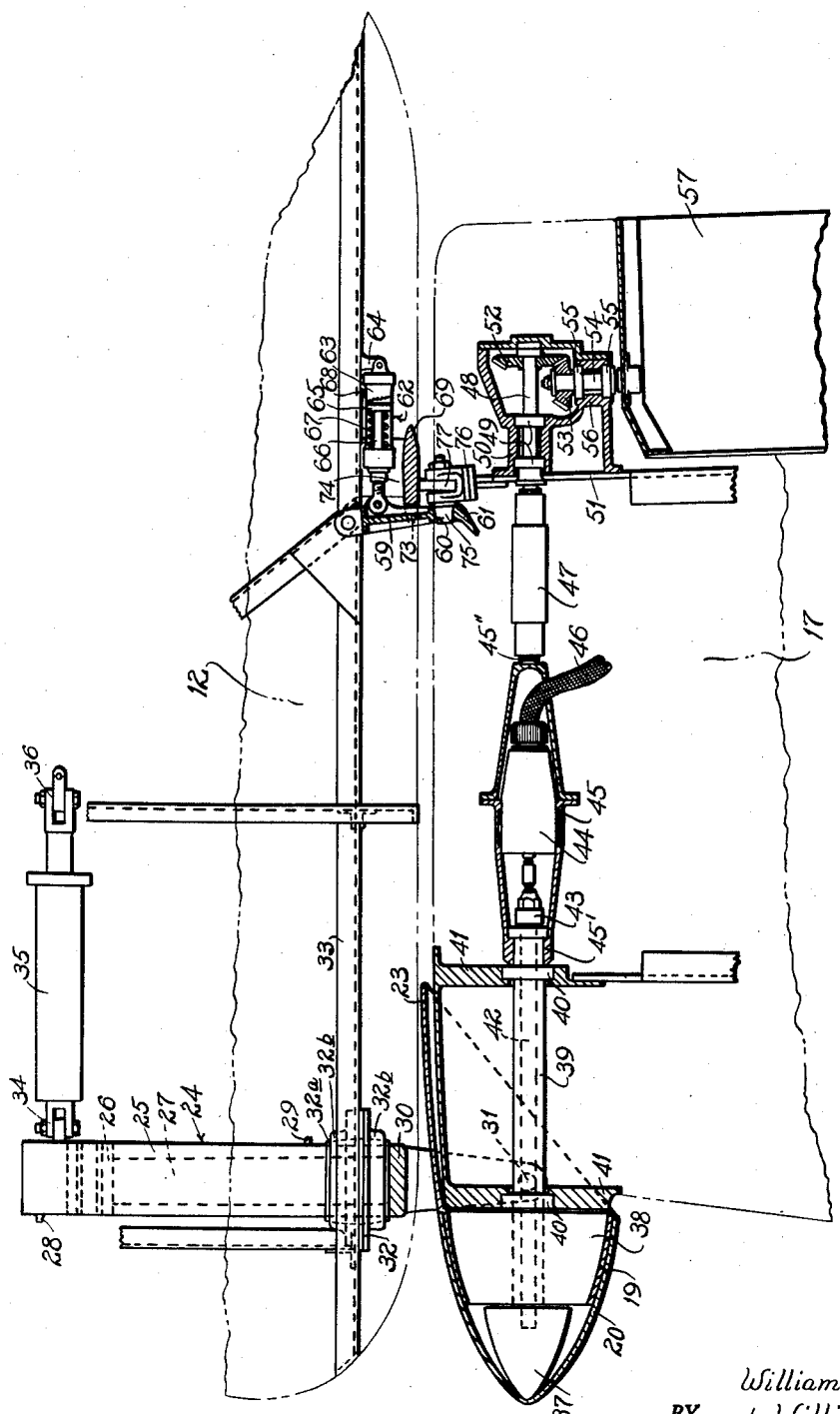

Dec. 9, 1958  W. H. DOYLE ET AL  2,863,618
AIRPLANE COUPLING MEANS
Filed April 29, 1954   3 Sheets-Sheet 3

INVENTOR.
William J. O'Donnell
BY and William H. Doyle
ATTORNEY.

United States Patent Office 2,863,618
Patented Dec. 9, 1958

2,863,618

AIRPLANE COUPLING MEANS

William H. Doyle, Oyster Bay, and William J. O'Donnell, Freeport, N. Y., assignors to Republic Aviation Corporation, near Farmingdale, Suffolk County, N. Y., a corporation of Delaware Application April 29, 1954, Serial No. 426,509

15 Claims. (Cl. 244—2)

This invention relates in general to airplanes and more particularly has to do with means for releasably interconnecting a plurality of airplanes for flight as a unified assembly.

It has been found that several airplanes may be coupled or connected in wing-tip to wing-tip relationship with the wings of a "parent" or central airplane to constitute a unified flight assembly, and that such flight assembly can be sustained solely by the power plant of the "parent" or central airplane without any attendant increase in its fuel consumption. To achieve optimum performance from such a unified flight assembly, it is necessary to maintain the wings of the coupled airplanes in substantial alignment so that they form lateral continuations of each other whereby the flanking airplanes attached to the wings of the central or "parent" airplane not only supply their own lift but also increase the combined lift of the airplanes in the assembly.

Among its other objects the present invention contemplates means for releasably coupling or interconnecting a plurality of airplanes during flight and includes means whereby the control surfaces of the coupled airplanes are automatically actuated so that the wings of the several airplanes of the assembly are maintained in alignment one with the other.

Since the several individual airplanes of the multiple flight assembly must take off and land independently, the instant invention provides for the connection of the flanking airplanes to the wing tips of the "parent" airplane while all of the airplanes are in flight or airborne after which the operation of the power plants of the flanking airplane may be stopped and remain idle during the flight of the unified assembly. Conversely the airplanes can be released or disconnected while in flight to permit of the individual and independent operation of the several airplanes.

With the above and other objects in view as will be apparent, this invention consists in the construction, combination and arrangement of parts all as hereinafter more described, claimed and illustrated in the accompanying drawings wherein:

Fig. 2 is a longitudinal section through the coupling means contemplated herein showing the wings of the attached airplanes in phantom;

Figure 1:
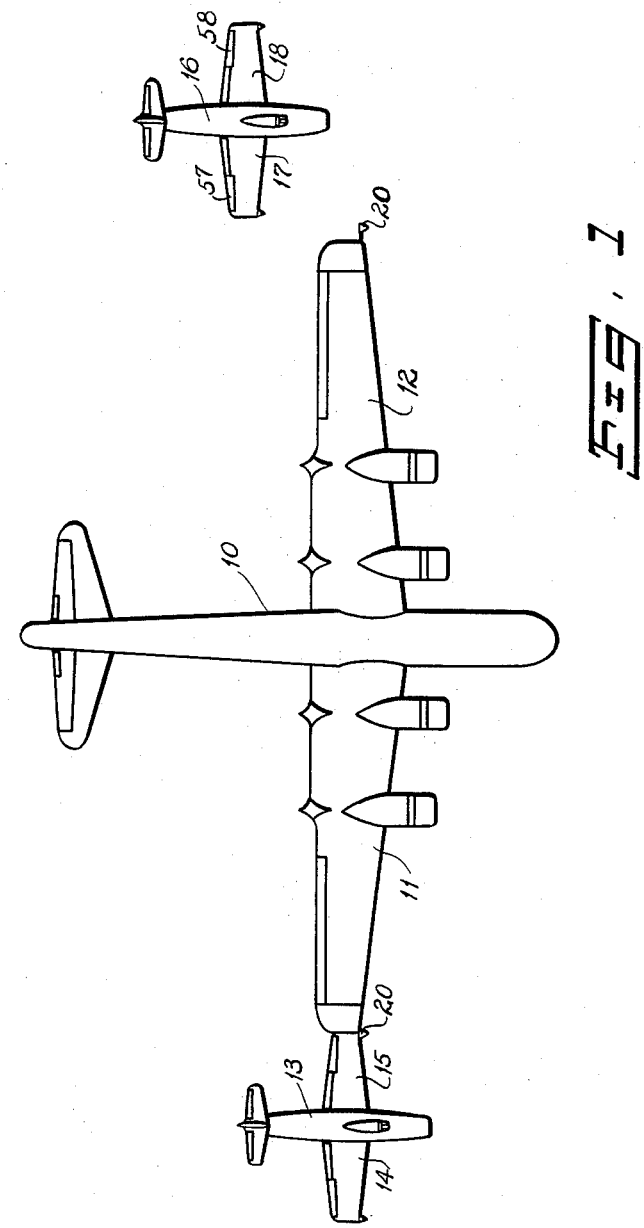
Fig. 1 is a plan view of a central or "parent" airplane having a flanking airplane coupled to one wing tip and a second flanking airplane approaching the opposite wing tip for coupling thereto.
Figure 4:
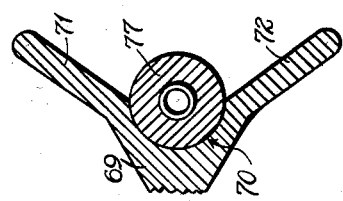
Fig. 4 is a vertical section through the guide associated with the secondary interlocking means.

In the operation of long-range military airplanes, for example, bombers, it is important to provide fighter protection for the bomber to and from its air base and while it is over the target area. Fighter protection is particularly necessary during the time the bomber is making its run over the target since during that time the bomber must remain on a relatively fixed and steady course, and hence, becomes an easy prey for enemy fighters.

The fuel capacity of a fighter is often insufficient to permit it to accompany the bomber from its air base to the target and return. Therefore, it has been proposed that each bomber tow one or more fighters along with it from the air base to the target area. Upon reaching the target area the fighters are released whereupon they are available for protective purposes. After the bomber has completed its run, the fighters may be reconnected to the bomber for the return flight to the air base.

In examining the various means of towing the fighters, it has been found that a fighter can be coupled or connected to each wing tip of the bomber to form a unified flight assembly. After such coupling the individual power plants of the attached or flanking fighters can be stopped and the power plant of the bomber will thereafter sustain the unified flight assembly without any increase in its fuel consumption. In fact, by maintaining the wings of the interconnected airplanes in substantial alignment so that they are practically coextensive with each other, the efficiency of the bomber's power plant is actually increased. Thus, such a unified flight assembly results not only in increasing the range of the bomber, but in addition, the fighters arrive at the target area with a relatively full supply of fuel.

It would be impractical, if not impossible, to take off and land such a unified flight assembly. Moreover, it is proposed to release the fighters over the target area and to reconnect them to the bomber for the return flight to the airbase. Therefore, it is manifest that the means for interconnecting or coupling the fighters to the bomber should be capable of operation while the aircraft are airborne, or in flight.

The present invention is directed toward means whereby a fighter may be releasably coupled to each wing tip of a bomber during flight to form a unified flight assembly. In general, the present invention contemplates primary interlocking means including means extensible from the wing tip of the bomber and engageable with means carried by wing tip of the fighter. After this initial or primary interconnection, the fighter is drawn into close relationship with the wing tip of the bomber and secondary coupling means then become effective to supplement the primary interlocking means. With this arrangement the interconnection of the aircraft may be achieved during flight with a minimum of danger. To provide for maintaining the wings of the unified flight assembly in substantial alignment, means are provided whereby the lateral stabilizing control surfaces of the fighters are automatically adjusted upon rolling movements of the interconnected airplanes relative to each other to realign the wings.

Although the present invention is described and illustrated as applied to military airplanes wherein the central or "parent" airplane is a bomber and the flanking airplanes are fighters, it is to be understood that the present invention has general utility and may be used in conjunction with any type of airplanes.

Referring to the drawings and more particularly to Fig. 1, 10 designates the "parent" airplane which may be a military airplane, such as a bomber, having right and left wings 11 and 12, respectively. In a manner to be more fully set forth below, a flanking airplane 13, for example, a fighter, having right and left wings 14 and 15, is coupled at the tip of wing 15 to the tip of the bomber wing 11, while a second fighter 16, having right and left wings 17 and 18, is shown as approaching the bomber wing 12 for coupling thereto at the tip of its wing 17.

Figure 3:
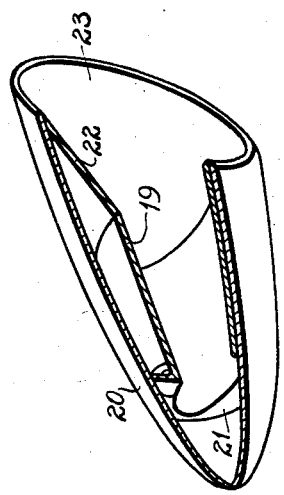
Fig. 3 is a perspective view, partially in section, of the elements of the primary interlocking means carried at the wing tip of the central or "parent" airplane.

As shown more particularly in Figs. 2 and 3, the elements of the primary interlocking means carried by the wing 12 of the bomber include a tapered elliptical sleeve or socket 19 that is suitably mounted within a conical or bullet shaped fairing 20. The narrow end of the sleeve 19 is provided with a circular outstanding flange 21 that is disposed normal to the longitudinal axis of the sleeve and which is suitably secured at its periphery to the inner surface of the fairing 20 adjacent to, but spaced rearwardly of, its apex. The opposite or wire end of the sleeve 19 is provided with a skirt 22 that flares outwardly to be coextensive with and to meet a partial extension 23 of the fairing 20 where it is fixedly secured thereto by any suitable means.

To provide means for mounting the socket 19 to the tip of the bomber wing 12 for limited rotary movement about vertical and horizontal axes normal to the longitudinal axis of the socket 19 and whereby it may be displaced in a lateral direction outwardly from the bomber wing-tip 12, the socket 19 is secured to a suitable actuator assembly 24 mounted in the forward part of the tip of the wing 12. As shown in Fig. 2, the actuator assembly 24 comprises a conventional hydraulic actuator, although other types of actuators may be used such as, for example, an electrically or mechanically operated screw jack. The actuator assembly 24 embodies a cylinder 25 having a piston 26 mounted for reciprocation therein and a piston rod 27 that is carried by the piston to be extended from one end of, or retracted into, the cylinder upon the reciprocation of the piston. The cylinder 25 also includes pressure ports 28 and 29 that are disposed at opposite ends of the cylinder 25 and which are connected to a suitable hydraulic system, not shown, carried by the bomber 10. Upon the operation of the hydraulic system, fluid under pressure is selectively introduced into either port 28 or port 29 and exhausted from the other to thereby move piston 26 within the cylinders 25 to extend or retract the piston rod 27. The outer end of the piston rod 27 is provided with a bifurcated member or yoke 30. The socket 19 is disposed between the arms of the yoke 30 and pivotally secured to the ends of the arms of the yoke by suitable pins 31.

The actuator assembly 24 is mounted on the forward portion of the tip of the bomber wing 12 through a universal joint 32 comprising a partially spherical member 32a that is secured to the end of the cylinder 25 from which the rod 27 extends and a pair of complemental supporting plates 32b that are provided with a partially spherical socket to receive the member 32a. The plates 32b are secured to opposite sides of the end rib 33 of the bomber wing 12. The opposite end of the cylinder 25 is connected through a pivotal joint 34 with one end of a conventional snubber or dampening assembly 35. The opposite end of snubber assembly 35 is connected by a pivotal joint 36 to the fixed structure of the bomber wing 12. To accommodate and permit the reciprocation and projection of the piston rod 27 relative to and from the wing tip, the outer end of the tip of the bomber wing 12 is provided with an opening.

The components of the primary interlocking means carried at the tip of the wing 17 of the fighter 16 comprise a tapered, elliptical probe having an apex portion or head 37 designed to pass through the sleeve 19 and be disposed between the apex of the fairing 20 and the flange 21 of the sleeve 19 and a base portion 38 that snugly fits within and engages the inner surface of the sleeve 19. The base portion 38 is splined or otherwise fixedly secured to one end of a hollow shaft 39 that extends through the base portion 38. The shaft 39, in turn, is rotatably supported in a pair of spaced bearings 40 that are carried by the structural members 41 positioned at and forming a part of the forward or leading edge of the tip of the fighter wing 17. A shaft 42 rotatably mounted in the hollow shaft 39 and extending at either end beyond the limits of the shaft 39, is splined or otherwise fixedly secured at one end to the apex or head portion 37 of the probe while the opposite end thereof is connected through a suitable coupling 43 with a motor 44. The motor 44 is disposed within and supported by a split housing 45 that is splined at 45′ to one end of the hollow shaft 39. The motor 44 is connected through a cable or conductor 46 with an electrical power source (not shown) carried by the fighter 16 to the end that the motor 44 may be actuated to rotate the apex or head portion 37 of the probe within the fairing 20 and relative to its base portion 38.

The opposite end of the split-housing 45 is splined at 45″ to one end of a connecting shaft 47 which, in turn, is similarly connected at its opposite end to one end of a shaft 48. The shaft 48 is supported for rotation in a pair of spaced bearings 49 that are suitably housed within a structural member 50 secured to the outer end of the aft or rear spar 51 of the fighter wing 17. At its opposite end the shaft 48 is provided with a bevel gear 52 that is keyed to the shaft for rotation in unison therewith and operatively engages a complemental bevel gear 53. This bevel gear 53 is fixedly mounted on one end of a torque tube 54 that is rotatably supported within a pair of spaced bearings 55 housed within an extension 56 of the structural member 50. The opposite end of torque tube 54 is fixedly secured to the right aileron or control surface 57 of the fighter wing 17. Aileron 57 is connected through conventional means with the other or left aileron 58 of the fighter 16.

Arranged as described above, the shaft 39, split-housing 45, connecting shaft 47 and gear shaft 48, in effect, constitute a unitary or composite shaft that is rotatably supported adjacent its opposite ends in bearings 40 and 49 and in substantial alignment fore and aft of the tip of the fighter wing 17. The base portion 38 of the probe and the bevel gear 52 are fixedly secured to the forward and aft ends, respectively, of this unitary shaft for rotation therewith. Moreover, the base portion 38 and the bevel gears 52 and 53 are so disposed relative to each other on this unitary shaft that when the major axis of the base portion 38 of the probe is in a substantially horizontal position the aileron 57 is in its neutral position. Therefore, rotary movement of the base portion 38 about its longitudinal axis is transmitted through the unitary shaft, the bevel gears 52 and 53 and the torque tube 54 to the aileron 57 to deflect the same from its neutral position. Conversely, deflections of the aileron 57 from its neutral position are transmitted through the torque tube 54, gears 53 and 52 and shaft 39 to the base portion 38 to rotate it about its longitudinal axis. Being conventionally connected to the aileron 58 the adjustment of the aileron 57 as aforesaid will appropriately deflect aileron 58 from its neutral position.

In the secondary interlocking means carried by the bomber wing 12 is a latch 59 that is pivotally mounted at one of its ends to the outboard end rib 33 of the bomber wing 12 at a point aft of the primary interlocking means. Adjacent its other or outer end, the latch 59 is provided with a tapered transverse opening 60 and the extreme outer extremity of this latch is formed into a striker plate 61. Medially of its length the latch 59 is pivotally connected to an actuator assembly 62 which serves to move it between a retracted position where it is disposed completely within the tip of the bomber wing 12 and a protracted position where the opening 60 and striker plate 61 are disposed outwardly beyond the limits of the bomber wing tip.

This actuator assembly 62 comprises a cylinder 63 that is pivotally mounted at one end thereof to a bracket 64 carried by the end rib 33 of the bomber wing 12. A piston 65 is mounted for reciprocation within the cylinder 63 and is provided with a piston rod 66 projecting through that end of the cylinder opposed to the bracket 64 where it is pivotally connected at its outer end to the latch 59. A spring 67 disposed within cylinder 63 is operative against piston 65 to move it in a direction to retract piston rod 66 inwardly of the cylinder and thereby swing latch 59 into its protracted position. The cylinder 63 is also provided with a port 68 that is connected to a suitable hydraulic system, not shown, of the bomber 10 whereby a pressurized hydraulic fluid is introduced into the cylinder to operate upon piston 65 and move it against the action of spring 67 to extend piston stem 66 from the cylinder and thereby swing latch 59 to its retracted position within the tip of the bomber wing.

The secondary interlocking means also includes a guide 69 having a longitudinal semi-circular groove 70, upon the opposite sides of which are formed upper and lower plates or arms 71 and 72, respectively, that diverge outwardly from the groove. At its forward edge, the guide 69 is provided with a cut-out or notch 73 that extends partially into one end of the groove 70. The guide 69 is mounted on the end rib 33 by a bracket 74 and is so disposed that the space between the diverging arms 71 and 72 faces outwardly and the central portion of latch 59 seats in the notch 73 when the latch 59 is in its projected position.

The secondary interlocking means situated at the tip of the fighter wing 17 consists of a frusto-conical stud 75 that is mounted by a suitable bracket 76 to the outer end or extremity of the aft spar 51 of the fighter wing 17. The stud 75 is disposed so as to have its narrow end face forwardly whereby it is engageable in the opening 60 in the latch 59 when the latter is in its projected position. To align the stud 75 with the opening 60 and thereby assure the proper insertion of the stud in said opening, a guide wheel 77 is rotatably supported in the bracket 76 for rotation about an axis substantially parallel to chord of the fighter wing 17. This guide wheel 77 is so positioned that its periphery or rim seats in the groove 70 in guide member 69 when the tip of the fighter wing 17 is in close proximity to the tip of the bomber wing 12.

To effect the coupling or interconnection of the bomber 10 and the fighter 16, the bomber is held on a steady course and the actuator assembly 24 is operated to extend its piston rod 27 from the cylinder 25 thereby moving the socket 19 and its associated fairing 20 outwardly from the tip of the bomber wing 12. Then the fighter 16 is maneuvered until the probe 37—38 at the tip of the wing 17 aligns with the socket 19. During this approach, the motor 44 is operated by the fighter pilot, if necessary, to rotate the major axis of the apex or head portion 37 of the probe to a substantially horizontal position thereby positioning it in substantial agreement with the major axis of socket 19. As above set forth, the base portion 38 of the probe is horizontally positioned by moving the control surface 57 to its neutral position.

With the parts of the probe thus positioned the continued flight of the fighter 16 moves the probe into socket 19 whereupon its apex portion 37 passes through the narrow end of the socket 19 and is positioned forwardly of the flange 21, while the base portion 38 of the probe snugly engages the socket. At this time, the motor 44 is operated by the fighter pilot to rotate the apex portion 37 of the probe through 90° thereby positioning its major axis normal to the major axis of the socket 19 and abutting the aft end of the apex portion 37 against the forward surface of the flange 21. Thus the probe is locked into engagement with the socket 19 and the bomber 10 and the fighter 16 are coupled by the primary interlocking means.

The actuator assembly 24 may then be operated to retract the piston rod 27 into the cylinder 25 thereby drawing the socket 19 and the coupled fighter 16 into close proximity with the tip of the bomber wing 12.

Prior to operating the actuator assembly 24 to retract the piston rod 27 and socket 19, the actuator assembly 62 has functioned under control of the bomber pilot to relieve the fluid pressure in the cylinder 63. The spring 67 is then effective to retract the stem 66 into the cylinder and move the latch 59 in a counter-clockwise direction to its protracted position where it engages the notch 73 of the guide 69.

As the fighter wing 17 is drawn to the bomber wing 12 by the retraction of the piston rod 27, the stud 75 contacts the striker plate 61 and slides along the plate thereby moving the latch 59 in a clockwise direction against the spring 67. At approximately the same time, the guide wheel 77 moves into the open end of the guide 69 between the arms 71 and 72. If the bomber wing 12 and fighter wing 17 are in proper horizontal alignment, the guide wheel 77 moves between the arms 71 and 72 of the guide 69 until it seats within the groove 70. Simultaneously the stud 75 slides along the striker plate 61 and the outer end of the latch 59 until it is aligned with the opening 60 whereupon the spring 67 rotates the latch 59 to seat the stud in its opening 60. Conversely, if the wings 12 and 17 are out of horizontal alignment, as the fiighter wing 17 approaches the bomber wing 12, the guide wheel 77 contacts either the upper arm 71 or the lower arm 72 of the guide 69, depending upon the direction of misalignment, and thereafter runs along the contacted arm until it seats within the groove 70. Simultaneously the stud 75 slides on the striker plate 61. When the guide wheel 77 seats within the groove 70, the opening 60 in the latch 59 is aligned with the stud 75 and the spring 67 moves the latch to engage its opening 60 with the stud. The seating of the stud 75 in the opening 60 and the location of the guide wheel 77 in the groove 70 renders the secondary interlocking effective to interconnect or couple the tip of the bomber wing 12 to the tip of the fighter wing 17, adjacent their aft or trailing edges.

Upon engagement of the primary and secondary interlocking means as aforesaid, the unitary or composite shaft formed by the shaft 39, the housing 45, and the shafts 47 and 48 is located substantially parallel to the tip of the bomber wing 12 of the bomber 10 and is fixedly locked or held in this position, i. e., this composite shaft is incapable of any bodily movement relative to the bomber wing. Thus, the composite shaft, in effect, becomes a part of the wing 12 of the bomber 10 and can only rotate about its longitudinal axis. Since this unitary or composite shaft is rotatably supported in the spaced bearings 40 and 49 carried by the fighter wing, rolling movements of the fighter 16 relative to the bomber 10 do not rotate the unitary shaft but instead, the fighter, in effect, rolls about the unitary shaft on the bearings 40 and 49. Conversely, rolling movements of the bomber 10 relative to the fighter 16 rotate the sleeve or socket 19 and base portion 38 of the probe about their longitudinal axes thereby rotating the unitary shaft.

Thus when the fighter 16 rolls relative to the bomber 10 the unitary shaft remains stationary. However, the bevel gear 53 travels on bevel gear 52 to deflect the aileron 57, and hence adjusts its connected aileron 58, to cause the proper corrective maneuver of the fighter 16. As the fighter 16 moves through this corrective maneuver, the travel of the bevel gear 53 on the bevel gear 52 reverses so that as the maneuver is completed and the wings 12 and 17 are once more in alignment, the ailerons 57 and 58 will have returned to their neutral positions.

On the other hand, rolling movements of the bomber 10 relative to the fighter 16 rotate the sleeve or socket 19 and the base portion 38 of the probe about their longitudinal axes thereby rotating the unitary or composite shaft in the bearings 40 and 49. The bevel gear 52 thereupon drives the bevel gear 53 to rotate the torque tube 54 to displace the aileron 57 and its companion aileron 58 from neutral thereby causing a corrective maneuver of the fighter 16 to realign its wing 17 with the wing 12 of the bomber 10. As this corrective movement is carried out the fighter 16 rolls about the unitary or composite shaft on the bearings 40 and 49 thereby causing the bevel gear 53 to travel around the bevel gear 52 and return the ailerons 57 and 58 to their neutral positions. Thus, by the time the wings 12 and 17 have been realigned the ailerons 57 and 58 have been returned to their neutral positions.

The disconnection or uncoupling of the fighter 16 from the bomber 10 is accomplished by reversing the sequence of operation for connecting the aircraft. Therefore, the secondary interlocking means are first disconnected by operating actuator 62 to disengage the latch 59 from the stud 75. The fighter 16 is then moved outwardly from the wing tip of the bomber 10 by the actuator 24 and to complete the uncoupling the primary interlocking means are then disengaged by the rotation of shaft 42 and probe head 37. More specifically, the secondary interlocking means are disengaged by admitting hydraulic fluid under pressure into the cylinder 63 of the actuator assembly 62. The piston 65 is thereby moved within the cylinder against the spring 67 to extend the piston stem 66 and move the latch 59 to its retracted position thus disengaging its opening 60 from the stud 75. The secondary interlocking means are now disengaged and the aft ends of wings 12 and 17 uncoupled.

After the secondary interlocking means have been disengaged, the actuator assembly 24 is operated by introducing hydraulic fluid under pressure through the port 28 into the cylinder 25 to extend the piston rod 27. The sleeve 19 of the primary interlocking means and hence the fighter 16 are thereby moved outwardly from the tip of the wing 12 of the bomber 10. The motor 44 is then operated to rotate the apex portion or head 37 of the probe through 90° thereby disengaging its base from the flange 21 and bringing it into alignment with the sleeve or socket 19. The primary interlocking means are now unlocked and the fighter 16 is suitably maneuvered to withdraw its probe from the socket 19 to complete the disengagement of the primary interlocking means and the complete uncoupling of the fighter 16 from the bomber 10.

The elements of the primary and secondary interlocking means carried by the wing 12 of the bomber 10 are duplicated at the tip of its wing 11 except for such rearrangement as is required to accommodate the mounting of these elements in the right wing 11 instead of the left wing 12 of the bomber 10. Similarly, the elements of the primary and secondary interlocking means carried by the wing 17 of the fighter 16, together with the means for adjusting the aileron of the fighter, are duplicated in the wing 14 of fighter 13 so that it may be attached to the wing 12 of the bomber 10, and in the wings 15 and 18 of the fighters 13 and 16, respectively, so that they may be attached to the wing 11 of the bomber 10.

What is claimed is:

1. A coupling for connecting a plurality of airplanes by their wings during flight for unified flight, said coupling comprising primary interlocking means carried by a wing tip of each airplane adjacent the leading edge thereof and organized and arranged for releasable engagement with each other during flight, secondary interlocking means carried by the wing tip of each airplane aft of said primary interlocking means and organized and arranged for releasable engagement with each other during flight, and means carried by the wing tip of one of said airplanes and operatively connected between the control surfaces of that wing and said primary interlocking means to actuate the control surfaces in response to rolling movements of said airplanes relative to each other.

2. A coupling for interconnecting a plurality of airplanes at their wing tips during flight, said coupling comprising primary interlocking means carried in part by a wing tip of each airplane adjacent the leading edge thereof and organized and arranged for releasable engagement with each other during flight, and secondary interlocking means carried by the wing tip of each airplane aft of said primary interlocking means and organized and arranged for releasable engagement with each other during flight.

3. A coupling for interconnecting a pair of airplanes by their wings, said coupling comprising primary interlocking means including a socket carried by the wing tip of one of said airplanes and a probe carried by the wing tip of the other of said airplanes to be received and locked in said socket, and secondary interlocking means including a latch carried by the wing tip of one of said airplanes and a stud carried by the wing tip of the other of said airplanes, said latch being engageable with said stud after connection of the primary interlocking means when the wings of said airplanes are positioned to form substantial continuations one of the other.

4. A coupling for interconnecting a pair of airplanes by the wings thereof during flight, said coupling comprising primary interlocking means including a socket carried by the wing tip of one of said airplanes, means for extending said socket outwardly from or retracting it into close relationship with its associated wing tip and a probe carried by the wing tip of the other of said airplanes to be received in and locked into engagement with said socket when in its extended position, and secondary interlocking means including a latch carried by the wing tip of one of said airplanes and a stud carried by the wing tip of the other of said airplanes, said latch being engageable with said stud after said probe is locked in said socket and when the wing tips of said airplanes are brought into substantially close relationship by the retraction of the socket.

5. In combination, a first airplane, primary and secondary interlocking means associated with the outer extremity of at least one wing of said first airplane, means associated with said primary interlocking means of said first airplane for positioning the same outwardly from or adjacent to its associated wing, and a second airplane having primary interlocking means releasably engageable with said primary interlocking means of said first airplane when disposed outwardly from its associated wing, and secondary interlocking means releasably engageable with said secondary interlocking means of said first airplane when said primary interlocking means of both airplanes are engaged and positioned adjacent the outer extremity of the wing of said first airplane.

6. In combination, a first airplane, primary and secondary interlocking means associated with the outer extremity of at least one wing of said first airplane, means associated with said primary interlocking means of said first airplane for positioning the same outwardly from or adjacent to its associated wing tip, and a second airplane having primary interlocking means releasably engageable with said primary interlocking means of said first airplane when in its outwardly disposed position, and secondary interlocking means releasably engageable with said secondary interlocking means of said first airplane when said primary interlocking means of both airplanes are engaged and positioned adjacent the outer extremity of the wing of said first airplane, said primary and secondary interlocking means of both said airplanes being organized and arranged to permit relative rolling movements of said interconnected airplanes.

7. In combination, a first airplane, primary and secondary interlocking means associated with the tip of at least one of its wings, means connected to said primary interlocking means of said first airplane for positioning it either outwardly from or adjacent to its associated wing tip, a second airplane having primary interlocking means releasably engageable with said primary interlocking means of said first airplane when disposed outwardly from the associated wing tip of the first airplane, and secondary interlocking means releasably engageable with the secondary interlocking means of said first airplane when said primary interlocking means of said first and second airplanes are engaged and positioned adjacent the outer extremity of the wing of said first airplane, said primary and secondary interlocking means of both said first and second airplanes being organized and arranged to permit relative rolling movements of said interconnected airplanes, and means carried by the wing of the second airplane and connecting the primary interlocking means of that airplane to a control surface of said second airplane whereby rolling movements of said connected airplanes actuate said control surface.

8. A coupling means for releasably connecting a pair of airplanes at their wing tips, said coupling comprising a tapered elliptical sleeve having a narrow open end and a relatively wide open end in axial alignment, means for mounting said sleeve to the leading edge portion of the wing tip of one of said airplanes, a tapered elliptical probe including a rotary locking apex portion and a base portion at the wing tip of the other airplane, said probe to be received in said sleeve with its locking apex portion disposed forwardly of the narrow open end of said sleeve and its base portion situated in said sleeve between its narrow and wide ends, a hollow outer shaft rotatably mounted in the wing tip of the other of said airplanes, the base portion of the probe being secured to one end of said hollow shaft for rotation therewith, an inner shaft rotatably mounted in said hollow shaft having one of its ends projecting beyond said hollow shaft and base portion to be secured to said locking apex portion, a housing in axial alignment with and secured at one of its ends to the end of said hollow outer shaft, power means in said housing connected to said inner shaft and operative to rotate said shaft and said locking apex portion relative to the narrow end of said sleeve and thereby lock said base portion into engagement with said sleeve, a connecting shaft rotatably supported in the wing tip in axial alignment with said housing and secured at one end to said housing, a bevel gear mounted on the other end of said connecting shaft, a torque tube rotatably supported in the wing tip and disposed normal to said connecting shaft, a bevel gear secured at one end of said torque tube and engaged with said bevel gear secured to said connecting shaft, the control surface of said other airplane being connected to the other end of said torque tube, a latch pivotally mounted in the wing tip of said first airplane aft of said sleeve, a stud mounted in the wing tip of said other airplane aft of said probe, a guide carried by said first airplane, guide means carried by said other aircraft for coaction with said guide to align said stud and latch when the wing tips of said pair of airplanes are in close relationship, and means for pivotally moving said latch to engage said stud, said hollow shaft, housing, connecting shaft and bevel gears operatively connecting the base portion of said probe to said torque tube whereby when the wings of said airplanes are in close relationship the control surface of said other aircraft is in its neutral position, and whereby relative rolling movements of said airplanes displace said control surface from its neutral position.

9. In combination, a first airplane, a tapered elliptical sleeve mounted to the leading edge portion of a wing tip of said first airplane, a second airplane, a shaft assembly rotatably mounted in a wing tip of said second airplane, a tapered elliptical probe secured to the forward end of said shaft assembly for rotation therewith, said tapered elliptical probe adapted to be received in and locked into engagement with said sleeve, a guide mounted on the wing tip of said first airplane aft of said sleeve, guide means mounted on the wing tip of said second airplane aft of said probe and engageable with said guide when the wing tips of said airplanes are in close relationship to align said wing tips, a latch pivotally mounted on the wing tip of said first airplane aft of said sleeve, a stud mounted on the wing tip of said second airplane aft of said probe, means carried by the wing tip of said first airplane and attached to said latch to move said latch into engagement with said stud when said wing tips are aligned by said guide member and guide means, interconnected control surfaces movably mounted on the wings of said second airplane, and gear means operatively connecting said shaft assembly to one of said interconnected control surfaces, said sleeve and probe and said latch and stud being organized and arranged to permit relative rolling movements of said first and second airplanes and said sleeve, probe, shaft assembly and gear means being so organized and arranged that when the associated wings of said first and second airplanes align to form continuations of each other said control surfaces are in their neutral positions and upon relative rolling movements of said first and second airplanes said control surfaces are deflected to maneuver said second airplane to realign its wings with the associated wing of said first airplane.

10. In combination, a parent airplane, an actuator mounted in the leading edge portion of a wing tip of said parent airplane, a tapered elliptical sleeve connected to said actuator, said actuator effective upon its operation in one direction to position said sleeve outwardly from the associated wing tip and upon operation in the opposite direction to position said sleeve adjacent the associated wing tip, a second airplane to be attached to the parent airplane, shaft means rotatably mounted in the wing tip of said second airplane, a tapered elliptical probe mounted at the forward end of said shaft means for rotation therewith, said probe adapted to be received and locked in said sleeve when disposed outwardly of the wing tip of the parent airplane whereby the operation of said actuator to move the sleeve inwardly toward the wing tip of the parent airplane also draws the wing tip of the second airplane into close relationship with the wing tip of said parent airplane, a latch pivotally mounted to the wing tip of said parent airplane, a stud mounted to the wing tip of said second airplane, said latch being adapted to engage said stud when the wing tips of said parent and second airplanes are in close relationship with each other, means for pivotally moving said latch to engage said stud, said sleeve and probe and latch and stud being organized and arranged to permit relative rolling movements of the parent and second airplane and a gear train connecting said shaft means with the control surfaces of the second airplane whereby said sleeve, probe, shaft means and gear train means, when the associated wings of said parent and second airplanes are aligned to form continuations of each other position the control surfaces of the second airplane in their neutral positions and upon relative rolling movements of said parent and second airplanes actuate the control surfaces of the second airplane to maneuver said second airplane to realign the wings thereof with the associated wing of said parent airplane.

11. In a coupling to connect the wing tips of two airplanes the combination with an actuator mounted in the wing tip of one airplane, of a socket pivotally attached to said actuator the operation of which positions the socket adjacent the wing tip or at a point removed therefrom, a probe carried at the wing tip of the other airplane to be received in said socket when it is positioned at a point removed from its position adjacent the wing tip, releasable locking means for retaining said probe within said socket, and a secondary means of attachment interposed between the wing tips of said airplanes aft of said socket and probe and automatically operable to connect the wing tips after the actuator has positioned the connected wing tips of both airplanes adjacent to each other.

12. A coupling for connecting at least two airplanes at their wing tips during flight comprising primary means of attachment carried in part by each wing tip adjacent the leading edge thereof and constructed and arranged for interlocking engagement, the part of said primary means of attachment carried by one of said wing tips including means for extending it from and retracting it toward the associated wing tip whereby after the interlocking engagement of said primary means of attachment the wing tips may be brought into relatively close proximity, and secondary means of attachment carried in part by each wing tip aft of said primary means of attachment and operable to connect said wing tips only upon their being brought into relatively close proximity as aforesaid.

13. A coupling for connecting two airplanes at their wing tips comprising a primary means of attachment carried in part by each wing tip adjacent the leading edge portions thereof and adapted for interlocking engagement, said primary attachment means including positioning means operable to displace the part of the primary means of attachment carried by one wing tip outwardly from said wing tip and to bring said part inwardly toward said wing tip whereby the wing tips may be brought into relatively close proximity after the interlocking engagement of said primary means of attachment, and secondary means of attachment carried in part by each wing tip and interposed between the trailing edge portions of said wing tips, said secondary attachment means being automatically operable to align and lockingly connect the wing tips when brought into relatively close proximity by the positioning means as aforesaid.

14. A coupling for connecting two airplanes at their wing tips during flight comprising a releasable primary means of attachment carried in part by each wing tip and adapted to be interposed between the leading edge portions thereof to interlockingly connect the same, said primary means of attachment including positioning means for disposing a part of said primary means of attachment away from its associated wing tip or to bring it toward its associated wing tip whereby upon the interlocking connection of said primary means of attachment the connected wing tips may be brought into relatively close proximity or conversely may be separated, secondary means of attachment carried in part by each wing tip adjacent the trailing edge portions thereof, said secondary means of attachment being automatically operable to align and connect the wing tips upon their being brought into close proximity by the positioning means as aforesaid, and means for releasing said secondary means of attachment prior to the removal of said wing tips from close proximity by the positioning means.

15. A coupling for connecting two airplanes at their wing tips during flight comprising primary means of attachment consisting of complemental parts adapted to interlock, one part being movably mounted on the wing tip of one airplane and its complemental part being fixedly mounted on the wing tip of the other airplane, means cooperating with the movable one of said parts to move it outwardly of its associated wing tip for engagement or disengagement with its complemental part and to retract it toward its associated wing tip after engaging or disengaging such complemental part, secondary means of attachment consisting of complemental parts, one part being carried by the wing tip of one airplane and its complemental part being carried by the wing tip of the other airplane, said parts of the secondary means of attachment being organized and arranged to be automatically interconnected only after interengagement of the parts of the primary means of attachment and upon the retraction of the movable part thereof as aforesaid, and means operatively connected to the fixed part of the primary means of attachment and to a control surface of the airplane carrying such fixed part for automatically operating said control surface upon relative movement by either of the two connected airplanes.

References Cited in the file of this patent

UNITED STATES PATENTS

| | | |
|---|---|---|
| 2,105,307 | Akerman | Jan. 11, 1938 |
| 2,385,392 | Van Dusen | Sept. 25, 1945 |
| 2,421,742 | Buettner | June 10, 1947 |
| 2,496,087 | Fleming | Jan. 31, 1950 |

FOREIGN PATENTS

| | | |
|---|---|---|
| 297,992 | Italy | June 25, 1932 |
| 566,201 | Great Britain | Dec. 19, 1944 |
| 600,477 | Great Britain | Apr. 9, 1948 |